(12) United States Patent
Ayirala et al.

(10) Patent No.: US 11,359,133 B2
(45) Date of Patent: Jun. 14, 2022

(54) METHODS FOR SELECTING SURFACTANT SOLUTIONS FOR USE IN ENHANCED OIL RECOVERY PROCESSES

(71) Applicant: Saudi Arabian Oil Company, Dhahran (SA)

(72) Inventors: Subhash Ayirala, Dhahran (SA); Abdulkareem M. AlSofi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/995,043

(22) Filed: Aug. 17, 2020

(65) Prior Publication Data

US 2022/0049152 A1 Feb. 17, 2022

(51) Int. Cl.
*E21B 43/16* (2006.01)
*C09K 8/584* (2006.01)

(52) U.S. Cl.
CPC .............. *C09K 8/584* (2013.01); *E21B 43/16* (2013.01)

(58) Field of Classification Search
CPC ................................. C09K 8/584; E21B 43/16
USPC ....................................................... 166/305.1
See application file for complete search history.

(56) References Cited

U.S. PATENT DOCUMENTS

| 7,461,694 B2 * | 12/2008 | Dahanayake ........ C09K 8/584 166/270.1 |
| 10,767,458 B2 | 9/2020 | Ayirala et al. |
| 2012/0160487 A1 * | 6/2012 | Barnes ................. C09K 8/584 166/279 |
| 2013/0081822 A1 | 4/2013 | Han et al. |
| 2014/0096967 A1 | 4/2014 | Sharma et al. |
| 2016/0032171 A1 | 2/2016 | Barnes et al. |
| 2017/0292375 A1 | 10/2017 | Feng et al. |
| 2018/0259499 A1 | 9/2018 | Al-Yousef et al. |

(Continued)

FOREIGN PATENT DOCUMENTS

| CA | 2991771 A1 | 1/2017 |
| WO | 2011100301 A2 | 8/2011 |
| WO | 2012091880 A2 | 7/2012 |

OTHER PUBLICATIONS

Daimazzone et al., "Mechanism of Crude-Oil/Water Interface Destabilization by Silicone Demulsifiers", Society of Petroleum Engineers, pp. 44-53, Mar. 2005.

(Continued)

*Primary Examiner* — Zakiya W Bates
*Assistant Examiner* — Ashish K Varma
(74) *Attorney, Agent, or Firm* — Dinsmore & Shohl LLP (57) ABSTRACT

A method for selecting a surfactant solution for use in an enhanced oil recovery process may include contacting a surfactant solution with crude oil to produce a crude/surfactant mixture, compressing the interface between the crude oil and the surfactant solution in a Langmuir trough to obtain an interface pressure versus surface area isotherm, calculating an interface compression energy of the interface between the crude oil and the surfactant solution by integrating the interface pressure versus surface area isotherm, and selecting the surfactant solution for use in an enhanced oil recovery process if the interface compression energy of the interface between the crude oil and the surfactant solution is at most 100 Ergs.

15 Claims, 6 Drawing Sheets

(56) References Cited

U.S. PATENT DOCUMENTS

2018/0291717 A1\* 10/2018 Ayirala .................. E21B 49/08
2019/0284466 A1\* 9/2019 Quintero ............... E21B 49/088

OTHER PUBLICATIONS

Fan et al., "Influence of Nononic Surfactants on the Surface and Interfacial Film Properties of Asphaltenes Investigated by Langmuir Balance and Brewster Angle Microscopy", Langmuir Article, American Chemical Society, Jan. 19, 2010.

Wang et al., "Langmuir Trough Study of Surfactant Mixtures Used in the Production of a New Ultrasound Contrast Agent Consisting of Stabilized Microbubbles", Americal Chemical Society, J. Phys. Chem., vol. 100, pp. 13815-13821, 1996.

International Search Report and Written Opinion dated May 7, 2021 pertaining to International application No. PCT/US2020/055893 filed Oct. 16, 2020, 17 pages.

Ayirala et al., "Water Ion Interactions at Crude-Oil/Water Interface and Their Implications for Smart Waterflooding in Carbonates", Society of Petroleum Engineers, SPE Journal, pp. 1817-1832, Oct. 2018.

Examination Report pertaining to GCC Application No. 2020-40797 dated Dec. 30, 2021, 6 pages.

\* cited by examiner

METHODS FOR SELECTING SURFACTANT SOLUTIONS FOR USE IN ENHANCED OIL RECOVERY PROCESSES

TECHNICAL FIELD

Embodiments of the present disclosure generally relate to analytical methods, more specifically, to methods for analyzing surfactant solutions.

BACKGROUND

Enhanced oil recovery is used to increase the recovery of crude oil from a reservoir. During enhanced oil recovery, various techniques may be used to increase the mobility of crude oil within the reservoir. Three primary techniques for enhanced oil recovery are gas injection, thermal injection, and chemical injection. During chemical injection enhanced oil recovery, various chemicals in dilute solutions may be injected into a reservoir. In some applications, surfactant solutions may be used to increase the mobility of crude oil within a reservoir during an enhanced oil recovery process.

SUMMARY

Surfactant solutions for use in enhanced oil recovery may be analyzed or screened to ensure that they are suitable of such use. Conventional methods for screening surfactant solutions often rely on qualitative or semi-quantitative analyses and often do not make use of direct measurements made at the interface between crude oil and a surfactant solution. Thus, there is a need for improved methods for screening surfactants that includes the use of quantitative measurements made at the interface between the crude oil and surfactant solution.

Embodiments of the present disclosure address this need and are directed to methods for selecting surfactant solutions for use in enhanced oil recovery processes. According to some embodiments, the interface compression energy of the interface between the crude oil and the surfactant solution may be calculated from measurements taken at the interface between the crude oil and the surfactant solution. The interface compression energy of the interface between crude oil and a surfactant solution may be used to determine the suitability of a surfactant solution for use in an enhanced oil recovery process. Thus, according to one or more embodiments, quantitative measurements taken at the interface between the crude oil and surfactant solution may be used to select surfactant solutions for use in enhanced oil recovery processes.

According to one or more embodiments, a method for selecting a surfactant solution for use in an enhanced oil recovery process may comprise contacting a surfactant solution comprising surfactant and brine with crude oil to produce a crude/surfactant mixture. An interface may form between the surfactant solution and the crude oil. The method may further comprise compressing the interface between the crude oil and the surfactant solution in a Langmuir trough to obtain an interface pressure versus surface area isotherm, and calculating an interface compression energy of the interface between the crude oil and the surfactant solution by integrating the interface pressure versus surface area isotherm. The method may also comprise selecting the surfactant solution for use in an enhanced oil recovery process if the interface compression energy of the interface between the crude oil and the surfactant solution is at most 100 Ergs.

According to one or more embodiments, a method for selecting a surfactant solution for use in an enhanced oil recovery process may comprise contacting crude oil with each of a brine solution and a surfactant solution comprising brine and surfactant to produce a crude/brine mixture and a crude/surfactant mixture, respectively. An interface may form between the brine solution and the crude oil, and an interface may form between the surfactant solution and the crude oil. The method may further comprise compressing the interface between the crude oil and the brine solution in the crude/brine mixture in a Langmuir trough to measure a first interface pressure versus surface area isotherm and compressing the interface between the crude oil and the surfactant solution in the crude/surfactant mixture in a Langmuir trough to measure a second interface pressure versus surface area isotherm. The method may comprise calculating a first interface compression energy by integrating the first interface pressure versus surface area isotherm and calculating a second interface compression energy by integrating the second interface pressure versus surface area isotherm. The method may further comprise selecting the surfactant solution for use in an enhanced oil recovery process if the order of magnitude of the second interface compression energy is at least two less than the order of magnitude of the first interface compression energy.

Additional features and advantages of the described embodiments will be set forth in the detailed description which follows, and in part will be readily apparent to those skilled in the art from that description or recognized by practicing the described embodiments, including the detailed description which follows and the claims.

BRIEF SUMMARY OF THE DRAWINGS

The following detailed description of specific embodiments of the present disclosure can be best understood when read in conjunction with the following drawings, where like structure is indicated with like reference numerals and in which.

DETAILED DESCRIPTION

The detailed description discloses one or more embodiments relevant to the appended claims. One or more embodiments of the present disclosure are directed to methods for selecting surfactant solutions for use in an enhanced oil recovery process. The methods may generally comprise contacting a surfactant solution comprising surfactant and brine with crude oil, compressing the interface between the crude oil and the surfactant solution to obtain an interface pressure versus surface area isotherm, calculating an interface compression energy of the interface between the crude oil and the surfactant solution by integrating the interface pressure versus surface area isotherm, and selecting the surfactant solution for use in an enhanced oil recovery process.

Definitions

As described herein, "enhanced oil recovery" may refer to a method or process for extracting crude oil from a reservoir. In one or more embodiments, enhanced oil recovery may include injecting a surfactant solution into a reservoir and recovering hydrocarbons from the reservoir. In one or more embodiments, the hydrocarbons may comprise crude oil.

As described herein, "crude oil" generally may refer to a naturally occurring hydrocarbon composition that may be found in a reservoir. Crude oil may have undergone no processing or minimal processing after being removed from a reservoir. Crude oil may be characterized by its API gravity. For example, crude oil contemplated for use in one or more embodiments may have an API gravity from 20° to 40°, or from 30° to 35°.

As described herein, "a surfactant solution" may be an aqueous solution comprising brine and at least one surfactant. In one or more embodiments, the surfactant solution may comprise more than one surfactant and brine. In one or more embodiments, the surfactant solution may comprise at least 0.01 wt. % surfactant. For example, the surfactant solution may comprise at least 0.01 wt. %, at least 0.05 wt. %, at least 0.10 wt. %, at least 0.2 wt. %, at least 0.3 wt. %, at least 0.4 wt. %, at least 0.5 wt. %, at least 0.6 wt. %, at least 0.7 wt. %, at least 0.9 wt. % or even at least 1.0 wt. % surfactant.

As described herein, an "interface" refers to the boundary between at least two phases, for example, between an aqueous phase and an oil phase.

As described herein, "interfacial tension" refers to the force of attraction between molecules at the interface of two fluids.

As described herein, an "interface compression energy" may quantify the energy required to compress the interface between an oil phase and an aqueous phase, for example, the interface between crude oil and a surfactant solution.

As described herein, "surfactant" may refer to a compound that may lower the surface tension or interfacial tension between two phases. For example, surfactants may lower the interfacial tension between two liquids, a gas and a liquid, or a solid and a liquid. In one or more embodiments, the surfactant may lower the interfacial tension between crude oil and brine. In one or more embodiments, the surfactant may be an amphoteric surfactant. As described herein, an "amphoteric surfactant" may be a molecule comprising cationic and anionic centers. For example, the surfactant may be a betaine amphoteric surfactant. In further embodiments, other classes of surfactants including anionic surfactants, such as petroleum sulfonates, internal olefin sulfonates, alcohol ethoxy sulfates, alcohol propoxy sulfates, and their mixtures; nonionic surfactants, such as alcohol ethoxylates; and cationic surfactants, such as dodecyl trimethy ammonium bromide, may be screened by the methods described herein.

As described herein, "brine" may refer to water containing one or more dissolved salts. In one or more embodiments, the brine may be free of solids wherein any salts in the brine are dissolved. In one or more embodiments, the brine may comprise inorganic salts. For example, the brine may comprise sodium chloride, calcium chloride, magnesium chloride. In one or more embodiments, the brine may comprise salts that may have dissolved and dissociated into cations and anions. In one or more embodiments, the brine may comprise one or more cations including sodium, magnesium, and calcium cations. In one or more embodiments, the brine may comprise one or more anions including chlorine, sulfate, and bicarbonate anions.

As described herein, a "brine solution" is a solution comprising brine, where the brine may be substantially the same as the brine in the surfactant solution. In one or more embodiments, the brine solution does not comprise any surfactant present in the surfactant solution.

As described herein, an "order of magnitude" is the smallest power of 10 used to represent a number. In one or more embodiments, the order of magnitude may be any integer. In one or more embodiments, the order of magnitude (b) of a number N may be expressed by the following equation:

$$N = a \times 10^b \text{ where } \frac{1}{\sqrt{10}} \leq a < \sqrt{10} \qquad \text{Equation 1}$$

Methods for Selecting Surfactant Solutions

Methods for selecting a surfactant solution for use in enhanced oil recovery may comprise preparing a surfactant solution. The surfactant solution may be prepared by any suitable means known in the art. For example, the surfactant solution may be prepared by adding a desired amount of surfactant to a brine solution in a vessel. In one or more embodiments, the surfactant and brine solution may be mixed during preparation of the surfactant solution. For example, the vessel containing surfactant and brine solution may be shaken manually to mix the surfactant and brine solution and form a surfactant solution.

Figure 1:
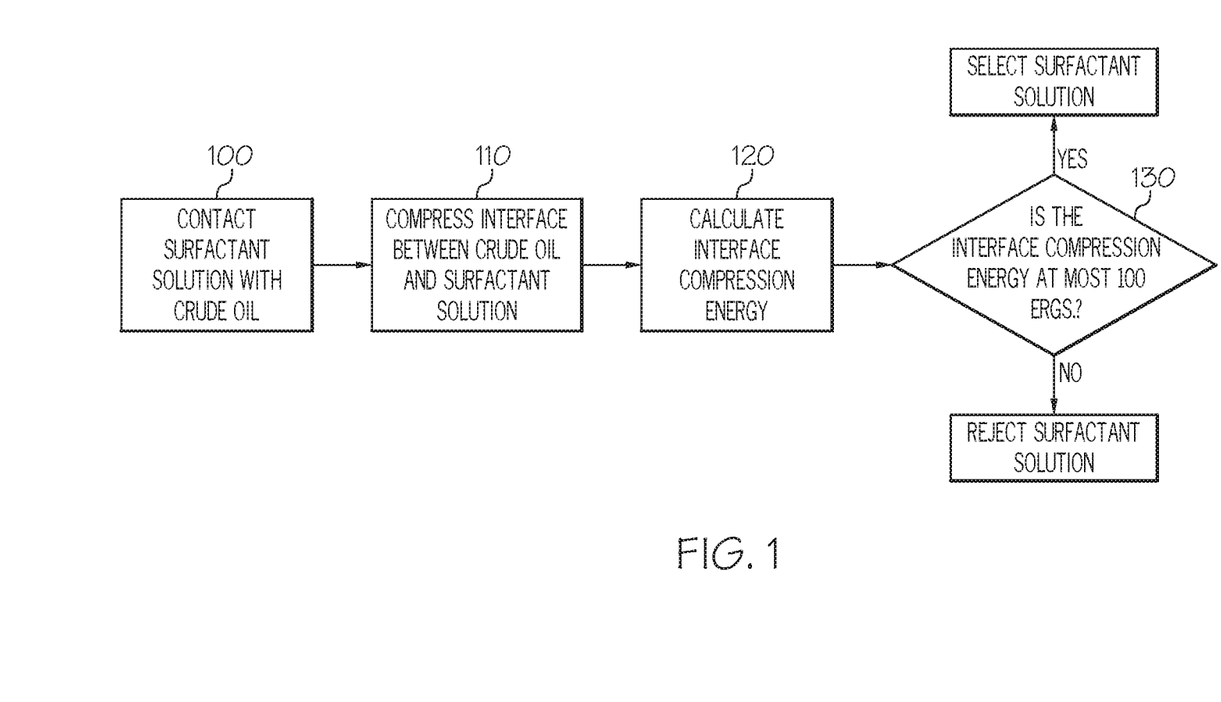
FIG. 1 is a flow chart depicting a method for selecting a surfactant solution, according to one or more embodiments described in this disclosure.

FIG. 1 depicts a flow chart of a method for selecting a surfactant solution. As shown in FIG. 1, the method may include contacting a surfactant solution with crude oil 100 to form a crude/surfactant mixture. Contacting the surfactant solution and crude oil may be achieved by mixing the surfactant solution with the crude oil. This mixing may be achieved by any suitable means known in the art. For example, in one or more embodiments, the mixing may be achieved by pouring the surfactant solution into a vessel containing crude oil, pouring crude oil into a vessel containing surfactant solution. In one or more embodiments, contacting surfactant solution and crude oil may include agitation. Agitation of the surfactant solution and crude oil may be achieved by any suitable means known in the art including agitation by vibration or manual shaking of a vessel containing crude oil and surfactant solution. In one or more embodiments, the contacting of the surfactant solution and the crude oil may occur in a clear vessel to allow visual inspection of the interface between the crude oil and the surfactant solution in the crude/surfactant mixture.

In one or more embodiments, the volume ratio of crude oil to surfactant solution in the crude/surfactant mixture may be from 4:1 to 1:4. For example, the volume ratio of crude oil to surfactant solution in the crude/surfactant mixture may be from 4:1 to 1:4, from 3:1 to 1:4, from 2:1 to 1:4, from 1:1 to 1:4, from 1:2 to 1:4, or even from 1:3 to 1:4. In further examples, the volume ratio of crude oil to surfactant solution in the crude/surfactant mixture may be from 4:1 to 1:4, from 4:1 to 1:3, from 4:1 to 1:2, from 4:1 to 1:1, from 4:1 to 2:1, or even from 4:1 to 3:1. In one or more embodiments, the volume ratio of crude oil to surfactant solution in the crude/surfactant mixture may be from 1:1 to 1:4. And in further embodiments, the volume ratio of crude oil to surfactant solution in the crude/surfactant mixture may be 1:1.

Upon mixing, an interface may form between the crude oil and the surfactant solution. In one or more embodiments, the interface may comprise a boundary between an aqueous phase, the surfactant solution, and an oil phase, the crude oil. In one or more embodiments, the interface may comprise a third phase between the aqueous phase and the oil phase.

In further embodiments, a microemulsion may form during the contacting of the surfactant solution and brine. As described herein, a "microemulsion" may be a thermodynamically stable mixture of oil, water, and surfactant. In one or more embodiments, a microemulsion may form spontaneously, without the input of energy into the system. The location of the microemulsion in a crude/surfactant mixture may be characterized by the Winsor phase behavior of the crude/surfactant mixture. Winsor type 1 phase behavior indicates an oil-in-water microemulsion in the aqueous phase. Winsor type II phase behavior indicates a water-in-oil microemulsion in the oil phase. Winsor type III phase behavior indicates a bicontinuous system where the surfactant solubilizes both oil and water and forms a third phase at the interface between the oil phase and the aqueous phase. Without wishing to be bound by theory, Winsor type II phase behavior is undesirable because the formation of a water-in-oil microemulsion may result in the loss of surfactant to the oil phase. Additionally, a water-in-oil microemulsion may be viscous and hinder the mobility of the crude oil within the reservoir during an enhanced oil recovery process.

As shown in FIG. 1, the method for selecting a surfactant solution may comprise compressing the interface between the crude oil and the surfactant solution 110 in a Langmuir trough to obtain an interface pressure versus surface area isotherm. As described herein, a "Langmuir trough" is an apparatus useful for measuring surface phenomena at an interface by compressing the interface. In some embodiments, a Langmuir trough may be used to obtain an interface pressure versus surface area isotherm for an interface between crude oil and a surfactant solution. In other embodiments, a Langmuir trough may be used to obtain an interface pressure versus surface area isotherm for an interface between crude oil and a brine solution.

Referring to FIG. 1, a method for selecting a surfactant solution may comprise calculating an interface compression energy 120 of the interface between crude oil and a surfactant solution by integrating the interface pressure versus surface area isotherm. In one or more embodiments, the compression energy may be calculated by any suitable integration means known in the art. For example, a computer may integrate the interface pressure versus surface area isotherm over the change in surface area to obtain a compression energy of an interface between crude oil and surfactant solution.

Next, the surfactant solution may be selected if the interface compression energy of the interface between the crude oil and the surfactant solution is at most 100 Ergs, 130 in FIG. 1. For example, the surfactant solution may be selected if the interface compression energy of the interface between the crude oil and the surfactant solution is at most 100 Ergs, 90 Ergs, 80 Ergs, 70 Ergs, 60 Ergs, 50 Ergs, 40 Ergs, 30 Ergs, 20 Ergs, 10 Ergs, or even 5 Ergs. In one or more embodiments, the surfactant solution may be selected if the interface compression energy of the interface between the crude oil and the surfactant solution is from 1 to 100 Ergs, from 1 to 90 Ergs, from 1 to 80 Ergs, from 1 to 70 Ergs, from 1 to 60 Ergs, from 1 to 50 Ergs, from 1 to 40 Ergs, from 1 to 30 Ergs, from 1 to 20 Ergs, from 1 to 10 Ergs, or even from 1 to 5 Ergs.

Without being limited by theory, it is believed that surfactant solutions that exhibit interface compression energies below 100 Ergs. may be suitable for use in an enhanced oil recovery process because low interface compression energies correlate to soft interfacial films at the interface between the crude oil and surfactant solution. These soft interfacial films may be easily broken to enhance the mobility of crude oil within the reservoir during an enhanced oil recovery process.

Figure 2:
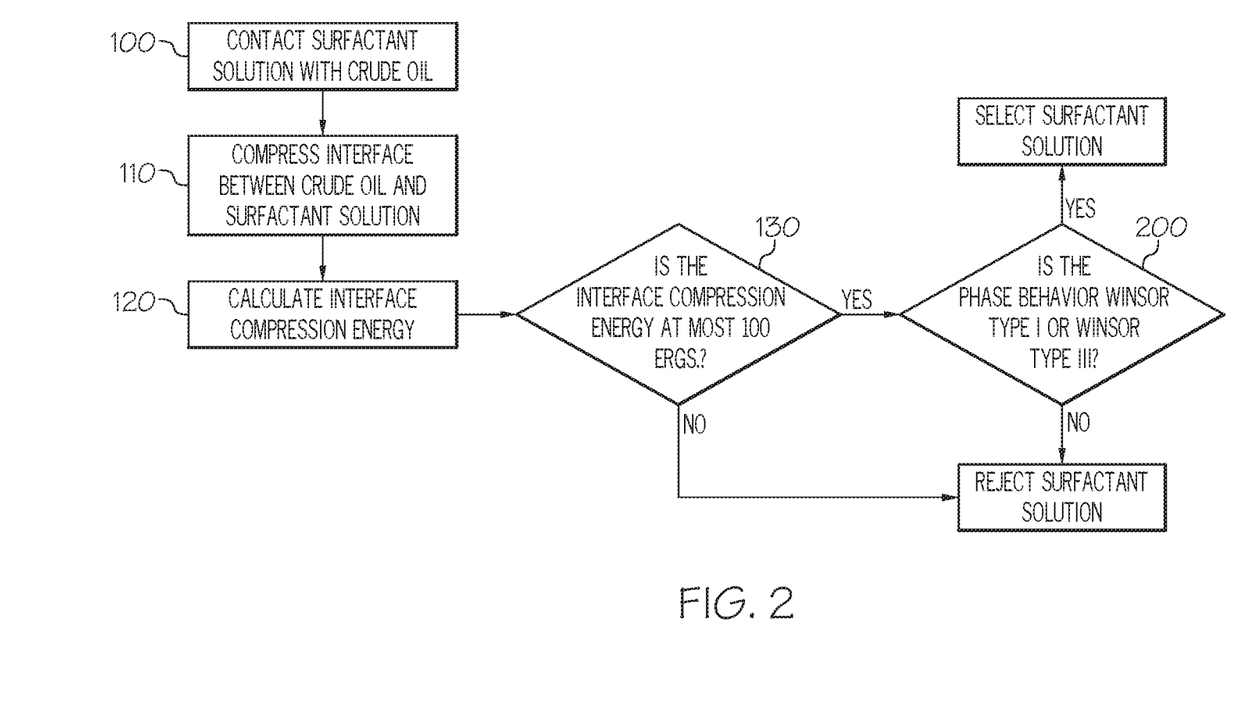
FIG. 2 is a flow chart depicting a method for selecting a surfactant solution, according to one or more embodiments described in this disclosure.

Referring now to other embodiments depicted in FIG. 2, a surfactant solution may be selected for use in an enhanced oil recovery process if the surfactant solution meets both a primary condition and a secondary condition. As described above, the primary condition may be that the interface compression energy of the interface between the crude oil and the surfactant solution is at most 100 Ergs. 130 and the secondary condition may be that the interface between the crude oil and the surfactant solution exhibits Winsor type I or Winsor type III phase behavior, 200. For example, a surfactant solution may be selected for use in an enhanced oil recovery process if the interface compression energy of the interface between the crude oil and the surfactant solution is within any of the interface compression energy ranges previously discussed, and the interface between the crude oil and the surfactant solution also exhibits Winsor type I or Winsor type III phase behavior. In one or more further embodiments, a surfactant solution may be selected for use in an enhanced oil recovery process if the interface compression energy of the interface between the crude oil and the surfactant solution is within any of the interface compression energy ranges previously discussed, and the interface between the crude oil and the surfactant solution also exhibits Winsor type I phase behavior.

Without wishing to be bound by theory, the combination of Winsor type I phase behavior and interface compression energy below 100 Ergs. may be desirable because the presence of a Winsor type I phase behavior ensures that the surfactant stays in the aqueous phase and the interface compression energy below 100 Ergs. indicates that the interface between the surfactant solution and crude oil will be sufficiently soft to allow for increased mobility of the crude oil within the reservoir. Thus, screening surfactant solutions by phase behavior and interface compression energy may result in the selection of surfactant solutions that are suitable for use in enhanced oil recovery processes.

In additional embodiments, a method for selecting a surfactant solution may further comprise measuring an interfacial tension of the interface between the surfactant solution and the crude oil. Interfacial tension may be used as a secondary or alternative condition for selecting surfactant solutions suitable for use in enhanced oil recovery. In one or more embodiments, the interfacial tension may refer to the attraction between molecules at the interface between crude oil and a surfactant solution. In one or more embodiments, a surfactant solution may be favorable for use in enhanced oil recovery if the interfacial tension between the crude oil and the surfactant solution is less than 0.1 mN/m. For example, a surfactant solution may be favorable for use in enhanced oil recovery if the interfacial tension between the crude oil and the surfactant solution is less than 0.1 mN/m, less than 0.09 mN/m, less than 0.08 mN/m, less than 0.07 mN/m, less than 0.06 mN/m, less than 0.05 mN/m, less than 0.04 mN/m, less than 0.03 mN/m, less than 0.02 mN/m, or even less than 0.01 mN/m. In one or more embodiments, a surfactant solution may be selected for use in an enhanced oil recovery process if the interfacial tension between the surfactant and the crude oil is from 0.1 to 0.001 mN/m. For example, a surfactant solution may be selected for use in an enhanced oil recovery process if the interfacial tension between the surfactant and the crude oil is from 0.1 to 0.001 mN/m, from 0.09 to 0.001 mN/m, from 0.08 to 0.001 mN/m, from 0.07 to 0.001 mN/m, from 0.06 to 0.001 mN/m, from 0.05 to 0.001 mN/m, from 0.04 to 0.001 mN/m, from 0.03 to 0.001 mN/m, from 0.02 to 0.001 mN/m, or even 0.01 to 0.001 mN/m.

Without wishing to be bound by theory, an interfacial tension below 0.1 mN/m may indicate the presence of soft interfacial films at the interface between the crude oil and surfactant solution which may be easily broken. This may increase the mobility of residual crude oil trapped within pores in reservoir rocks due to capillary forces. Thus, a surfactant solution that provides low interfacial tension at the interface between the surfactant solution and crude oil may be desirable for use in an enhanced oil recovery process.

The interfacial tension may be measured in a spinning drop tensiometer, a pendant drop tensiometer, or in any other suitable device known in the art. For example, in one or more embodiments, the interfacial tension between the surfactant solution and the crude oil may be measured in a spinning drop tensiometer.

Figure 3:
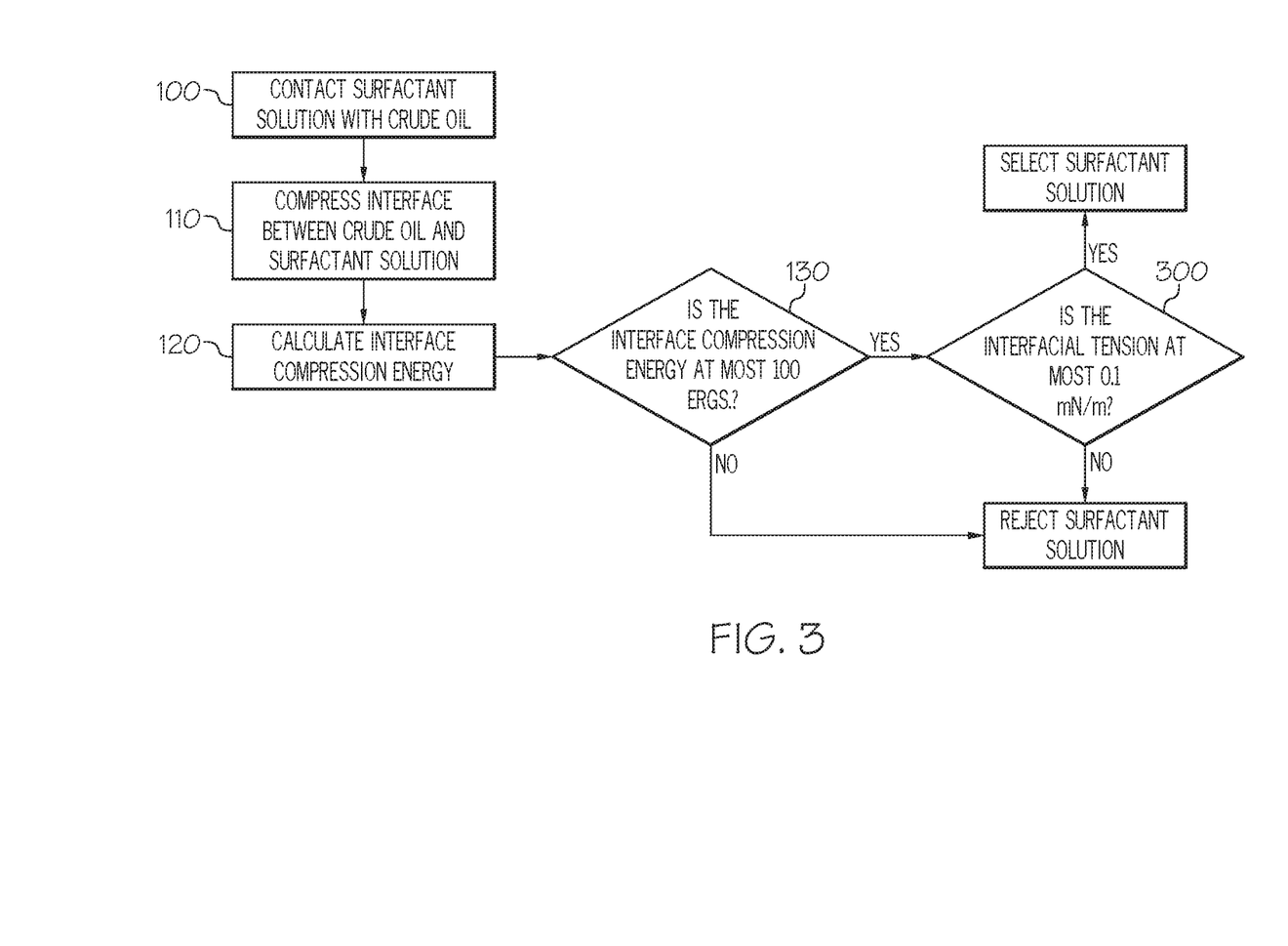
FIG. 3 is a flow chart depicting a method for selecting a surfactant solution, according to one or more embodiments described in this disclosure.

Referring to other embodiments depicted in FIG. 3, a surfactant solution may be selected for use in an enhanced oil recovery process if the surfactant solution meets both a primary condition and a secondary condition. In one or more embodiments, the primary condition may be that the interface compression energy of the interface between the crude oil and the surfactant solution is at most 100 Ergs., 130, and the secondary condition may be that an interfacial tension between the surfactant solution and the crude oil is less than 0.1 mN/m, 300. For example, a surfactant solution may be selected for use in an enhanced oil recovery process if the interface compression energy of the interface between the crude oil and the surfactant solution is within any of the interface compression energy ranges previously discussed, and the interfacial tension between the crude oil and the surfactant solution is within any of the interfacial tension ranges previously discussed.

Considering both interface compression energy and interfacial tension measurements while selecting surfactant solutions may result in the selection of surfactant solutions that provide a soft interface between the surfactant solution and the crude oil. As discussed above, a soft interface between the crude oil and surfactant solution may easily break and thus enhance the mobility of crude oil within a reservoir during enhanced oil recovery. Thus it may be beneficial to consider both interface compression energy and interfacial tension when selecting surfactant solutions.

Figure 4:
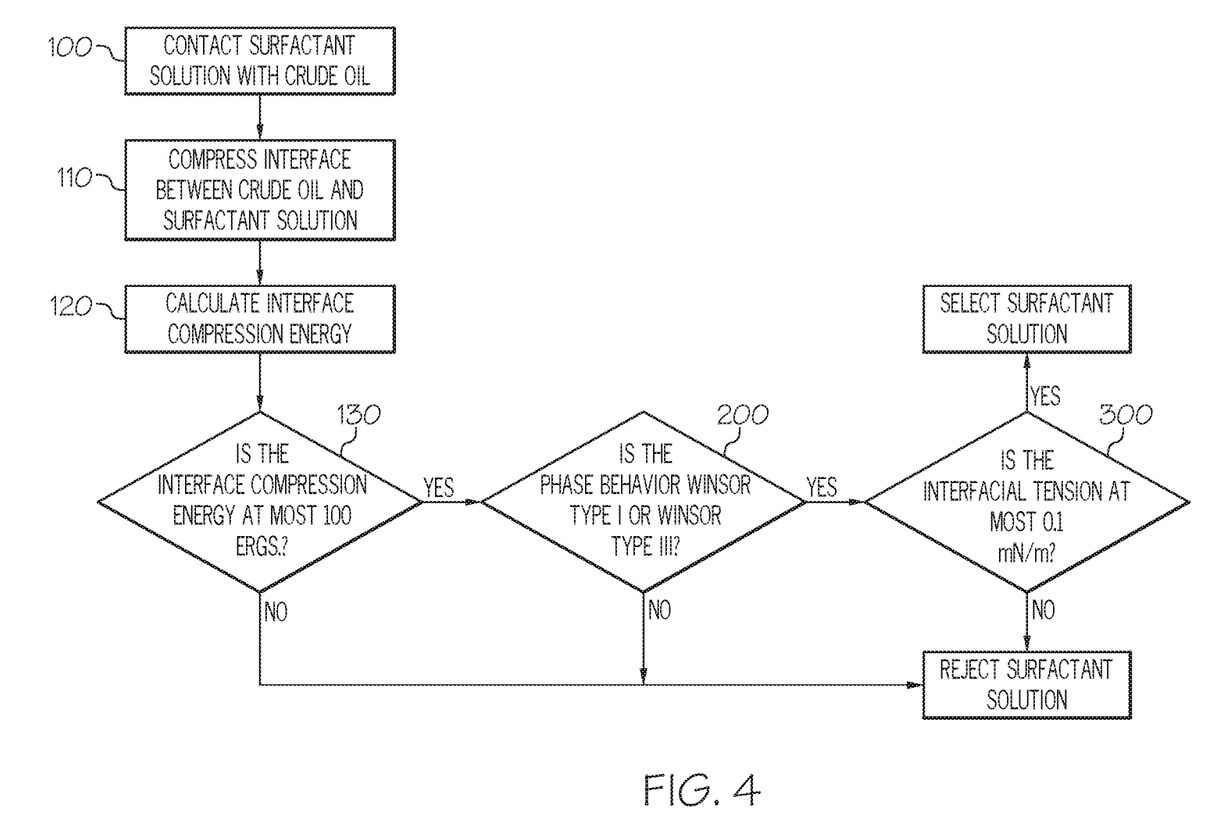
FIG. 4 is a flow chart depicting a method for selecting a surfactant solution, according to one or more embodiments described in this disclosure.

In one or more embodiments, a surfactant solution may be selected for use in an enhanced oil recovery process if the surfactant solution meets a primary condition, a secondary condition and a tertiary condition, as displayed in FIG. 4. The primary condition may be that the interface compression energy of the interface between the crude oil and the surfactant solution is at most 100 Ergs., 130, the secondary condition may be that the interface between the crude oil and the surfactant solution exhibits Winsor type I or Winsor type III phase behavior, 200, and the tertiary condition may be that an interfacial tension between the surfactant solution and the crude oil is less than 0.1 mN/m, 300. For example, a surfactant solution may be selected for use in an enhanced oil recovery process if the interface compression energy of the interface between the crude oil and the surfactant solution is within any of the interface compression energy ranges previously discussed, the interface between the crude oil and the surfactant solution also exhibits Winsor type I or Winsor type III phase behavior, and the interfacial tension between the crude oil and the surfactant solution is within any of the interfacial tension ranges previously discussed.

Considering interface compression energy, phase behavior, and interfacial tension when selecting surfactant solutions may result in the selection of surfactant solutions that provide a soft interface between the crude oil and the surfactant solution and ensure that the surfactant does not form an undesirable water-in-oil microemulsion. As discussed above, these features are desirable in surfactant solutions for use in enhanced oil recovery. Thus it may be beneficial to consider interface compression energy, phase behavior, and interfacial tension when selecting surfactant solutions.

In one or more embodiments, the method for selecting a surfactant solution may include a comparative analysis in which the interaction of the surfactant solution and crude oil are compared to the interaction of a brine solution with crude oil. The surfactant solution may be selected based on the extent to which the interaction between the surfactant solution and crude oil differs from the interaction between the brine solution and the crude oil as further discussed herein.

Figure 5:
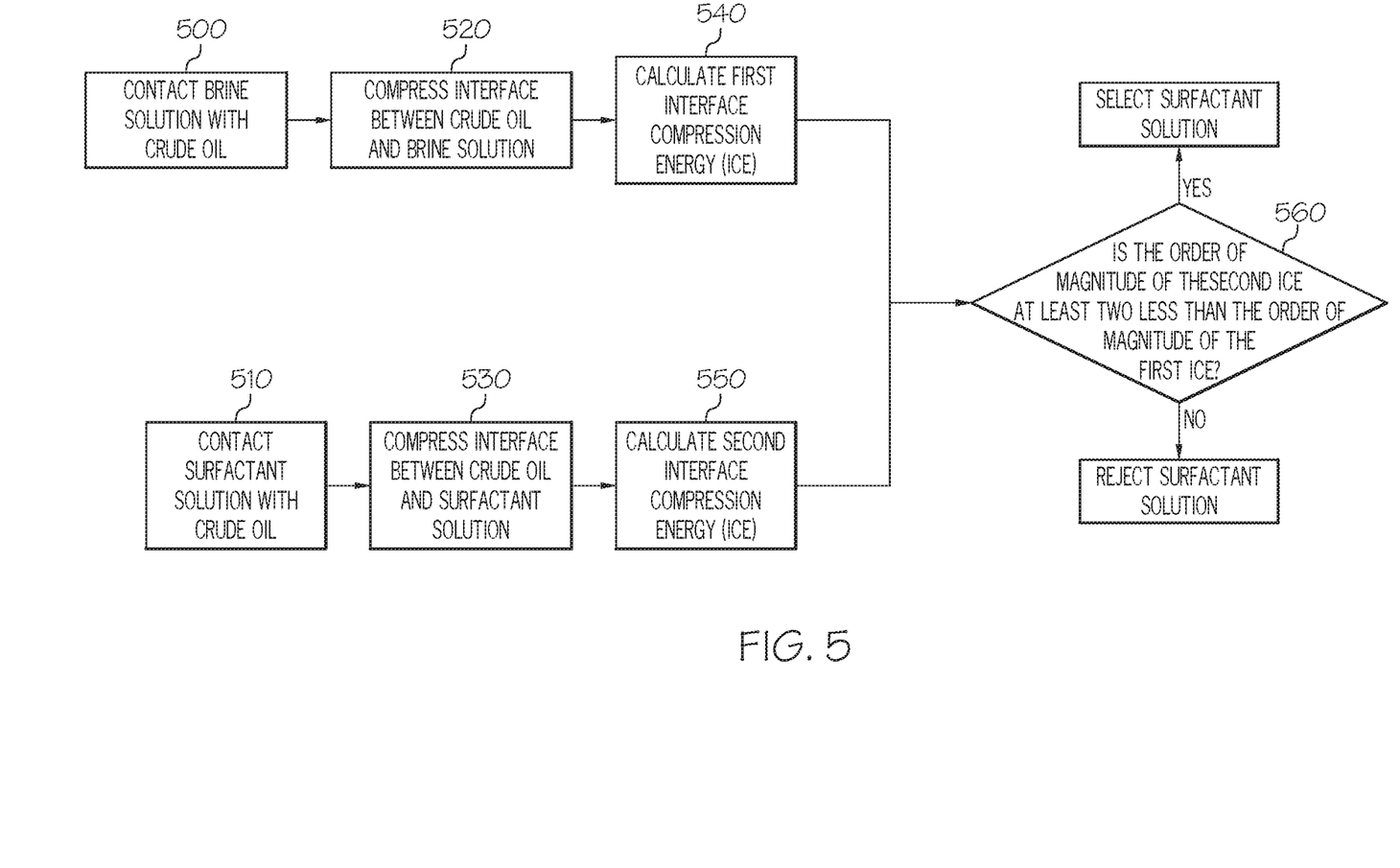
FIG. 5 is a flow chart depicting a method for selecting a surfactant solution, according to one or more embodiments described in this disclosure.

Referring to embodiments illustrated by FIG. 5, a method for selecting a surfactant solution for use in an enhanced oil recovery process may include comparing interface compression energies of an interface between crude oil and a surfactant solution and an interface between crude oil and a brine solution. In one or more embodiments, selecting a surfactant solution for use in an enhanced oil recovery process may comprise contacting crude oil with each of a brine solution, 500, and a surfactant solution, 510, comprising brine and surfactant to produce a crude/brine mixture and a crude/surfactant mixture respectively.

Moreover, the method comprising contacting both the brine solution and surfactant solution with crude oil may be achieved by mixing the brine solution or the surfactant solution with the crude oil as discussed previously. In one or more embodiments, contacting surfactant solution or brine solution with crude oil may include agitation. Agitation of the brine solution or surfactant solution mixed with crude oil may be achieved by means previously discussed above.

The crude/brine mixture may have a volume ratio of crude oil to brine solution from 4:1 to 1:4. For example, the volume ratio of crude oil to brine solution in the crude/brine mixture may be from 4:1 to 1:4, from 3:1 to 1:4, from 2:1 to 1:4, from 1:1 to 1:4, from 1:2 to 1:4, or even from 1:3 to 1:4. In further examples, the volume ratio of crude oil to brine solution in the crude/brine mixture may be from 4:1 to 1:4, from 4:1 to 1:3, from 4:1 to 1:2, from 4:1 to 1:1, from 4:1 to 2:1, or even from 4:1 to 3:1. In one or more embodiments, the volume ratio of crude oil to brine solution in the crude/brine mixture may be from 1:1 to 1:4. And in further embodiments, the volume ratio of crude oil to brine solution in the crude/brine mixture may be 1:1. The crude/surfactant mixture may have volume ratios of crude oil to surfactant solution from 4:1 to 1:4 and other subranges as defined above.

Referring again to FIG. 5, the method may comprise compressing the interface between the crude oil and the brine solution in the crude/brine mixture in a Langmuir trough to measure a first interface pressure versus surface area isotherm, 520. In one or more embodiments, a method for selecting a surfactant solution for an enhanced oil recovery process may comprise compressing the interface between the crude oil and the surfactant solution in the crude/surfactant mixture in a Langmuir trough to measure a second interface pressure versus surface area isotherm, 530.

As depicted in FIG. 5, a method for selecting a surfactant solution for use in an enhanced oil recovery process may comprise calculating a first interface compression energy by integrating the first interface pressure versus surface area isotherm, 540. In one or more embodiments, this first interface compression energy may be considered a reference interface compression energy because it represents the interface compression energy at the interface between a brine solution and crude oil when no surfactant is present. In one or more embodiments, subsequent interface compression energies, for example, a second interface compression energy, obtained from interfaces between crude oil and various surfactant solutions may be compared to this first interface compression energy.

Furthermore, a method for selecting a surfactant solution for use in an enhanced oil recovery process may comprise calculating a second interface compression energy by integrating the second interface pressure versus surface area isotherm, 550. In one or more embodiments, a surfactant solution may be favorable for use in an enhanced oil recovery process if the order of magnitude of the second interface compression energy is at least two less than the first interface compression energy.

In one or more embodiments, the compression energy may calculated by any suitable integration means known in the art. For example, a computer may integrate the interface pressure versus surface area isotherm over the change in surface area to obtain a compression energy of an interface between crude oil and surfactant solution.

Referring to FIG. 5, a method for selecting a surfactant solution for use in an enhanced oil recovery process may comprise selecting the surfactant solution for use in an enhanced oil recovery process if the order of magnitude of the second interface compression energy is at least two less than the order of magnitude of the first interface compression energy, 560. For example, in one or more embodiments, a surfactant solution may be selected for use in an enhanced oil recovery process if the order of magnitude of the second interface compression energy is two or three less than the order of magnitude of the first interface compression energy. In one or more embodiments, the comparison of the order of magnitude of interface compression energies may be a primary condition for selecting a surfactant solution and may be used in conjunction with a secondary and even a tertiary condition, such as phase behavior, as previously described.

A method for selecting a surfactant solution for use in an enhanced oil recovery process may further comprise comparing the interfacial tension between the surfactant solution and the crude oil with the interfacial tension between the brine solution and the crude oil. Means for measuring interfacial tension include those previously described. In one or more embodiments, a surfactant solution may be suitable for use in an enhanced oil recovery process if the order of magnitude of the interfacial tension between the surfactant solution and the crude oil is at least two less than the order of magnitude of the interfacial tension between the brine solution and the crude oil. For example, a surfactant solution may be suitable for use in an enhanced oil recovery process if the order of magnitude of the interfacial tension between the surfactant solution and the crude oil is two or three less than the order of magnitude of the interfacial tension between the brine solution and the crude oil. This comparison of the order of magnitude of the interfacial tensions may be used as a secondary or tertiary condition for selecting a surfactant solution, as discussed previously.

It is contemplated that a surfactant solution selected by the above described methods may be used in an enhanced oil recovery process. For example, a surfactant solution may be selected by the above described methods. The surfactant solution may be injected into a reservoir during an enhanced oil recovery process. Then, hydrocarbons, including crude oil, may be recovered from the reservoir during the enhanced oil recovery process.

EXAMPLES

The examples are representative of embodiments of the presently disclosed subject matter, and are not meant as limiting the scope of the claims.

Example 1—Preparation of a Surfactant Solution

A surfactant solution was prepared by mixing a betaine type amphoteric surfactant with brine, so the concentration of surfactant in the surfactant solution was 0.1 wt. %. The molecular weight of the surfactant was 430 g/mol, and the active surfactant content was 50%. The composition of the brine is displayed in Table 1.

TABLE 1

| Brine | Cations Concentration (ppm) | | | Anions Concentration (ppm) | | | TDS (ppm) |
| --- | --- | --- | --- | --- | --- | --- | --- |
| | $Na^+$ | $Mg^{2+}$ | $Ca^{2+}$ | $SO_4^{2-}$ | $Cl^-$ | $HCO_3^-$ | |
| High Salinity Water | 18240 | 2110 | 650 | 4290 | 32200 | 120 | 57610 |

Example 2—Phase Behavior Observations

The phase behavior at the interface between the surfactant solution and crude oil was observed by the following method. 5 mL of the surfactant solution of Example 1 was added to a glass test tube. 5 mL of crude oil were added to the test tube. The crude oil was from a carbonate reservoir and exhibited a 34° API gravity and 14.0 cP viscosity at ambient conditions. The glass test tube was gently shaken to mix the surfactant solution and crude oil. Then the glass test tube was stored in an oven at reservoir temperature, about 95° C.

The surfactant solution and crude oil reached stable conditions within one day. The surfactant preferably solubilized oil into the water phase to form a lower phase oil-in-water micro-emulsion. The formation of the lower phase micro-emulsion was evidenced by the green color of the water phase. Additionally, the upper oil phase remained clear due to the negligible presence of the surfactant in the oil. Visual observation of the lower micro-emulsion phase indicated that the phase exhibited low viscosity, comparable to the viscosity of water. The presence of a lower phase oil-in-water micro-emulsion is characteristic of Winsor type I phase behavior. This Winsor type I phase behavior was stable for over one week.

The presence of Winsor type I phase behavior between the oil and water phases indicates that the surfactant will preferably stay with the water phase and will likely generate favorable interface conditions for enhanced oil recovery.

Example 3—Interfacial Tension Measurements

Interfacial tension between crude oil and surfactant solution was measured with a spinning drop tensiometer. This method is considered appropriate to measure interfacial tensions typically below 1.0 mN/m. The surfactant solution of Example 1 was injected into a capillary tube until the tube was completely filled. Then one drop of the crude oil of Example 2 was injected into the capillary tube. The capillary tube was then inserted into the spinning drop tensiometer and the temperature was raised to reservoir temperature, about 95° C. The capillary tube was rotated at angular frequencies from 3000 to 8000 RPM and the diameter of the oil drop was measured until equilibrium is reached. Interfacial tension was calculated using the measured drop diameter, the rotational frequency, and the densities of the surfactant solution and crude oil. The interfacial tension between the crude oil and surfactant solution was 0.009 mN/m.

Additionally, the interfacial tension between the crude oil of Example 2 and the brine of Example 1 was measured using a pendant drop tensiometer. This method is well suited to measure interfacial tensions above 1.0 mN/m. In this technique, the oil drop is formed using a hooked needle at the bottom of the cell, while the cell is filled with brine phase. The shape of the pendant drop so formed is captured with a software to calculate interfacial tension by fitting a theoretical profile to the captured drop image using Young-Laplace equation. The interfacial tension between the crude oil of Example 2 and the brine of Example 1 was 19 mN/m. The interfacial tension measurements are displayed in Table 2.

TABLE 2

|  | Brine and Crude Oil | Brine and Surfactant |
|---|---|---|
| Interfacial Tension | 19 mN/m | 0.009 mN/m |
| Order of Magnitude | 1 | −2 |

As displayed in Table 2, the surfactant reduced the interfacial tension by over two orders of magnitude. Additionally, the reduced interfacial tension exhibited by the surfactant solution shows that the surfactant solution would be suitable for use in enhanced oil recovery operations.

Example 4—Interface Pressure Measurement and Compression Energy Calculation

Figure 6:
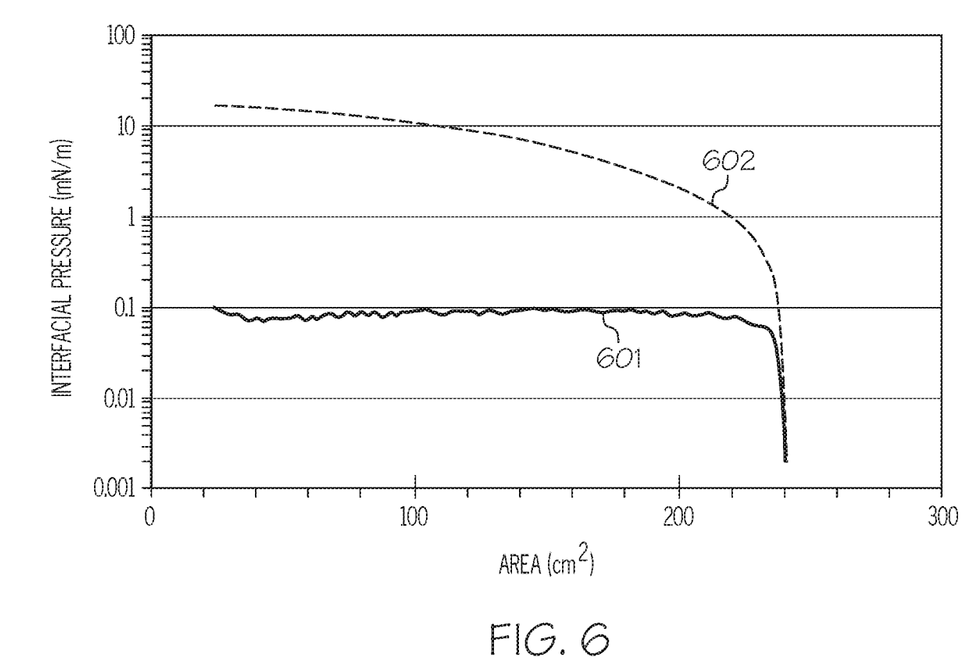
FIG. 6 is a graph depicting interface pressure versus surface area isotherms, according to one or more embodiments described in this disclosure.

Interface pressure vs. surface area isotherms were obtained for the interface between the surfactant solution of Example 1 and the crude oil of Example 2 and for the interface between the brine of Example 1 and the crude oil of Example 2. Interface pressure vs. surface area isotherms were obtained by compressing the interface in a Langmuir trough at a velocity of 10 mm/min from 243 $cm^2$ to 25 $cm^2$. The interface pressure vs. surface area isotherms are displayed in FIG. 6. Line 601 corresponds to the interface pressure vs. surface area isotherm for the interface between the surfactant solution of Example 1 and the crude oil of Example 2, and line 602 corresponds to the interface pressure vs. surface area isotherm between the brine of Example 1 and the crude oil of Example 2. The lower slope exhibited in the interface pressure vs. surface area isotherm for the interface between the surfactant solution of Example 1 and the crude oil of Example 2 suggests that the interfacial films become softer in the presence of the surfactant.

Compression energies were computed by integrating the interfacial pressure from the interface pressure vs. surface area isotherms over the surface area. The compression energy of the interface between the surfactant solution of Example 1 and the crude oil of Example 2 was 17.3 Erg, and the compression energy of the interface between the brine of Example 1 and the crude oil of Example 2 was 1725 Erg. These calculated compression energies are displayed in Table 3.

TABLE 3

|  | Brine and Crude Oil | Brine and Surfactant |
|---|---|---|
| Compression Energy | 1725 Ergs. | 17.3 Ergs. |
| Order of Magnitude | 3 | 1 |

As shown in Table 3, the addition of the surfactant reduced the compression energy of the interface by two orders of magnitude. This indicates that the surfactant solution is suitable for use in enhanced oil recovery operations to aid in the removal of trapped residual oil.

According to an aspect, either alone or in combination with any other aspect, a method for selecting a surfactant solution for use in an enhanced oil recovery process includes contacting a surfactant solution comprising surfactant and brine with crude oil to produce a crude/surfactant mixture, where an interface forms between the surfactant solution and the crude oil. The method may further include: compressing the interface between the crude oil and the surfactant solution in a Langmuir trough to obtain an interface pressure versus surface area isotherm; calculating an interface compression energy of the interface between the crude oil and the surfactant solution by integrating the interface pressure versus surface area isotherm; and selecting the surfactant solution for use in an enhanced oil recovery process if the interface compression energy of the interface between the crude oil and the surfactant solution is at most 100 Ergs.

According to a second aspect, either alone or in combination with any other aspect, the method further comprises preparing the surfactant solution comprising surfactant and brine.

According to a third aspect, either alone or in combination with any other aspect, the surfactant solution comprises at least 0.01 wt. % surfactant.

According to a fourth aspect, either alone or in combination with any other aspect, the crude/surfactant mixture has a volume ratio of crude oil to surfactant solution from 4:1 to 1:4.

According to a fifth aspect, either alone or in combination with any other aspect, the surfactant solution is selected if the interface compression energy of the interface between the crude oil and the surfactant solution is from 1 to 100 Ergs.

According to a sixth aspect, either alone or in combination with any other aspect, the surfactant solution is selected for use in an enhanced oil recovery process if the interface compression energy of the interface between the crude oil and the surfactant solution is at most 100 Ergs, and the interface between the crude oil and the surfactant solution also exhibits Winsor type I or Winsor type III phase behavior.

According to a seventh aspect, either alone or in combination with any other aspect, the surfactant solution is selected if the interface between the crude oil and the surfactant solution exhibits Winsor type I phase behavior.

According to an eighth aspect, either alone or in combination with any other aspect, the method further comprises measuring an interfacial tension of the interface between the surfactant solution and the crude oil and selecting the surfactant solution for use in an enhanced oil recovery process if the interface compression energy of the interface between the crude oil and the surfactant solution is at most 100 Ergs, and an interfacial tension between the surfactant solution and the crude oil is less than 0.1 mN/m.

According to a ninth aspect, either alone or in combination with any other aspect, the interfacial tension between the surfactant solution and the crude oil is measured in a spinning drop tensiometer.

According to a tenth aspect, either alone or in combination with any other aspect, the surfactant solution is selected if the interfacial tension between the surfactant solution and the crude oil is from 0.1 to 0.001 mN/m.

According to an eleventh aspect, either alone or in combination with any other aspect, a method for selecting a surfactant solution for use in an enhanced oil recovery process includes contacting crude oil with each of a brine solution and a surfactant solution comprising brine and surfactant to produce a crude/brine mixture and a crude/surfactant mixture, respectively, where an interface forms between the brine solution and the crude oil and an interface forms between the surfactant solution and the crude oil. The method further includes: compressing the interface between the crude oil and the brine solution in the crude/brine mixture in a Langmuir trough to measure a first interface pressure versus surface area isotherm; compressing the interface between the crude oil and the surfactant solution in the crude/surfactant mixture in a Langmuir trough to measure a second interface pressure versus surface area isotherm; calculating a first interface compression energy by integrating the first interface pressure versus surface area isotherm; calculating a second interface compression energy by integrating the second interface pressure versus surface area isotherm; and selecting the surfactant solution for use in an enhanced oil recovery process if the order of magnitude of the second interface compression energy is at least two less than the order of magnitude of the first interface compression energy.

According to a twelfth aspect, either alone or in combination with any other aspect, the crude/surfactant mixture has a volume ratio of crude oil to surfactant solution of 4:1 to 1:4, and the crude/brine mixture has a volume ratio of crude oil to brine solution of 4:1 to 1:4.

According to a thirteenth aspect, either alone or in combination with any other aspect, the surfactant solution is selected for use in an enhanced oil recovery process if the order of magnitude of the second interface compression energy is at least two less than the order of magnitude of the first interface compression energy, and the interface between the crude oil and the surfactant solution also exhibits Winsor type I or Winsor type III phase behavior.

According to a fourteenth aspect, either alone or in combination with any other aspect, the surfactant solution is selected if the interface between the crude oil and the surfactant solution exhibits Winsor type I phase behavior.

According to a fifteenth aspect, either alone or in combination with any other aspect, the method further comprises: measuring an interfacial tension between the surfactant solution and the crude oil; measuring an interfacial tension between the brine solution and the crude oil; and selecting the surfactant solution for use in an enhanced oil recovery process if the order of magnitude of the second interface compression energy is at least two less than the order of magnitude of the first interface compression energy and the order of magnitude of the interfacial tension between the surfactant solution and the crude oil is at least two less than the order of magnitude of the interfacial tension between the brine solution and the crude oil.

According to a sixteenth aspect, either alone or in combination with any other aspect, the interfacial tension between the surfactant solution and the crude oil is measured in a spinning drop tensiometer, and the interfacial tension between the brine solution and the crude oil is measured in a pendant drop tensiometer.

According to a seventeenth aspect, either alone or in combination with any other aspect, an enhanced oil recovery process may include injecting the selected surfactant solution of any aspect into a reservoir, and recovering hydrocarbons from the reservoir.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the present invention without departing from the spirit and scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method for selecting a surfactant solution for use in an enhanced oil recovery process comprising:
    contacting a surfactant solution comprising surfactant and brine with crude oil to produce a crude/surfactant mixture, wherein an interface forms between the surfactant solution and the crude oil, and wherein the surfactant solution comprises at least 0.1 wt. % surfactant;
    compressing the interface between the crude oil and the surfactant solution in a Langmuir trough to obtain an interface pressure versus surface area isotherm;
    calculating an interface compression energy of the interface between the crude oil and the surfactant solution by integrating the interface pressure versus surface area isotherm; and
    selecting the surfactant solution for use in an enhanced oil recovery process, wherein the surfactant solution is selected if the interface compression energy of the interface between the crude oil and the surfactant solution is at most 100 Ergs, and the interface between the crude oil and the surfactant solution exhibits Winsor type I phase behavior, wherein the surfactant stays in an aqueous phase of an oil-in-water microemulsion.

2. The method of claim 1, wherein the method further comprises preparing the surfactant solution comprising surfactant and brine.

3. The method of claim 1, wherein the crude/surfactant mixture has a volume ratio of crude oil to surfactant solution from 4:1 to 1:4.

4. The method of claim 1, wherein the surfactant solution is selected if the interface compression energy of the interface between the crude oil and the surfactant solution is from 1 to 100 Ergs.

5. The method of claim 1, wherein the method further comprises:
   measuring an interfacial tension of the interface between the surfactant solution and the crude oil; and
   selecting the surfactant solution for use in an enhanced oil recovery process if the interface compression energy of the interface between the crude oil and the surfactant solution is at most 100 Ergs, and an interfacial tension between the surfactant solution and the crude oil is less than 0.1 mN/m.

6. The method of claim 5, wherein the interfacial tension between the surfactant solution and the crude oil is measured in a spinning drop tensiometer.

7. The method of claim 5, wherein the surfactant solution is selected if the interfacial tension between the surfactant solution and the crude oil is from 0.1 to 0.001 mN/m.

8. An enhanced oil recovery process comprising:
   injecting the selected surfactant solution of claim 1 into a reservoir; and
   recovering hydrocarbons from the reservoir.

9. The method of claim 1, wherein the method further comprises:
   measuring an interfacial tension of the interface between the surfactant solution and the crude oil; and
   selecting the surfactant solution for use in an enhanced oil recovery process if the interface compression energy of the interface between the crude oil and the surfactant solution is from 1 to 100 Ergs; an interfacial tension between the surfactant solution and the crude oil is from 0.1 to 0.001 mN/m; and the interface between the crude oil and the surfactant solution also exhibits Winsor type I phase behavior, wherein the surfactant stays in an aqueous phase of an oil-in-water microemulsion.

10. A method for selecting a surfactant solution for use in an enhanced oil recovery process comprising:
    contacting crude oil with each of a brine solution and a surfactant solution comprising brine and surfactant to produce a crude/brine, mixture and a crude/surfactant mixture, respectively, wherein an interface forms between the brine solution and the crude oil and an interface forms between the surfactant solution and the crude oil, and wherein the surfactant solution comprises at least 0.1 wt. % surfactant;
    compressing the interlace between the crude oil and the brine solution in the crude/brine mixture in a Langmuir trough to measure a first interface pressure versus surface area isotherm:
    compressing the interface between the crude oil and the surfactant solution in the crude/surfactant mixture in a Langmuir trough to measure a second interface pressure versus surface area isotherm;
    calculating a first interface compression energy by integrating the first interface pressure versus surface area isotherm;
    calculating a second interface compression energy by integrating the second interface pressure versus surface area isotherm; and
    selecting the surfactant solution for use in an enhanced oil recovery process, wherein the surfactant solution is selected if the order of magnitude of the second interface compression energy is at least two less than the order of magnitude of the first interface compression energy, and the interface between the crude oil and the surfactant solution exhibits Winsor type I phase behavior, wherein the surfactant stays in an aqueous phase of an oil-in-water microemulsion.

11. The method of claim 10, wherein the crude/surfactant mixture has a volume ratio of crude oil to surfactant solution of 4:1 to 1:4, and the crude/brine mixture has a volume ratio of crude oil to brine solution of 4:1 to 1:4.

12. The method of claim 10, wherein the method further comprises:
    measuring an interfacial tension between the surfactant solution and the crude oil;
    measuring an interfacial tension between the brine solution and the crude oil; and
    selecting the surfactant solution for use in an enhanced oil recovery process if the order of magnitude of the second interface compression energy is at least two less than the order of magnitude of the first interface compression energy and the order of magnitude of the interfacial tension between the surfactant solution and the crude oil is at least two less than the order of magnitude of the interfacial tension between the brine solution and the crude oil.

13. The method of claim 12, wherein the interfacial tension between the surfactant solution and the crude oil is measured in a spinning drop tensiometer, and the interfacial tension between the brine solution and the crude oil is measured in a pendant drop tensiometer.

14. An enhanced oil recovery process comprising:
    injecting the selected surfactant solution of claim 10 into a reservoir; and
    recovering hydrocarbons from the reservoir.

15. The method of claim 10, wherein the method further comprises:
    measuring an interfacial tension between the surfactant solution and the crude oil;
    measuring an interfacial tension between the brine solution and the crude oil; and
    selecting the surfactant solution for use in an enhanced oil recovery process if:
      the order of magnitude of the second interface compression energy is at least two less than the order of magnitude of the first interface compression energy;
      the order of magnitude of the interfacial tension between the surfactant solution and the crude oil is at least two less than the order of magnitude of the interfacial tension between the brine solution and the crude oil; and
      the interface between the crude oil and the surfactant solution exhibits Winsor type I phase behavior, wherein the surfactant stays in an aqueous phase of an oil-in-water microemulsion.

* * * * *